US010126491B2

(12) United States Patent
Gooden

(10) Patent No.: US 10,126,491 B2
(45) Date of Patent: Nov. 13, 2018

(54) METHODS AND APPARATUS TO PROVIDE LIGHTING IN REFRIGERATORS

(71) Applicant: WHIRLPOOL CORPORATION, Benton Harbor, MI (US)

(72) Inventor: Corey M. Gooden, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/152,723

(22) Filed: May 12, 2016

(65) Prior Publication Data

US 2016/0259124 A1 Sep. 8, 2016

Related U.S. Application Data

(63) Continuation of application No. 14/207,982, filed on Mar. 13, 2014, now Pat. No. 9,377,578.
(Continued)

(51) Int. Cl.

| F21V 8/00 | (2006.01) |
| F25D 27/00 | (2006.01) |
| F21K 9/61 | (2016.01) |
| F21V 5/04 | (2006.01) |
| F21V 7/00 | (2006.01) |
| F21V 33/00 | (2006.01) |

(Continued)

(52) U.S. Cl.
CPC .............. *G02B 6/0096* (2013.01); *F21K 9/61* (2016.08); *F21V 5/04* (2013.01); *F21V 7/00* (2013.01); *F21V 33/0044* (2013.01); *F25D 11/00* (2013.01); *F25D 25/022* (2013.01); *F25D 25/024* (2013.01); *F25D 25/025* (2013.01); *F25D 27/00* (2013.01); *F25D 27/005* (2013.01); *F21W 2131/305* (2013.01); *F21Y 2101/00* (2013.01)

(58) Field of Classification Search
CPC . F21W 2131/305; F25D 27/00; F25D 27/005; F25D 2327/00; F25D 2327/001; F21K 9/61; G02B 6/0095; F21V 33/0044
USPC .......................................................... 362/92
See application file for complete search history.

(56) References Cited

U.S. PATENT DOCUMENTS

| 5,735,589 A * | 4/1998 | Herrmann ............. B29C 33/123 108/102 |
| 5,836,669 A | 11/1998 | Hed |

(Continued)

FOREIGN PATENT DOCUMENTS

| EP | 0971186 A | 1/2000 |
| EP | 0970642 B1 | 12/2000 |

(Continued)

OTHER PUBLICATIONS

European Search Report, dated Jul. 27, 2015, for Application No. 14160287.0-1605/2778585, 7 pages.

*Primary Examiner* — William N Harris
(74) *Attorney, Agent, or Firm* — Price Heneveld LLP

(57) ABSTRACT

Example methods and apparatuses to provide lighting in appliances are disclosed. An example refrigerator includes a compartment disposed within the refrigerator having first and second opposite side walls, a movable component disposed in the compartment, the movable component having a front edge, a light pipe extending along the front edge of the movable component, and a first light source positioned at the first side wall to emit light into a first end of the light pipe.

19 Claims, 5 Drawing Sheets

Related U.S. Application Data

(60) Provisional application No. 61/790,054, filed on Mar. 15, 2013.

(51) Int. Cl.
- *F25D 11/00* (2006.01)
- *F25D 25/02* (2006.01)
- *F21W 131/305* (2006.01)
- *F21Y 101/00* (2016.01)

(56) References Cited

U.S. PATENT DOCUMENTS

| | | | |
|---|---|---|---|
| 5,913,584 A * | 6/1999 | Swindell | A47B 57/06 108/108 |
| 6,179,434 B1 * | 1/2001 | Saraiji | A47F 3/001 108/23 |
| 6,210,013 B1 * | 4/2001 | Bousfield | F25D 27/00 362/218 |
| 6,558,017 B1 | 5/2003 | Saraiji et al. | |
| 6,601,984 B2 * | 8/2003 | Yamamoto | F21S 9/026 362/559 |
| 6,726,341 B2 | 4/2004 | Pashley et al. | |
| 6,918,679 B2 | 7/2005 | Wu | |
| 6,962,116 B2 | 11/2005 | Bienick et al. | |
| 7,163,305 B2 | 1/2007 | Bienick | |
| 7,201,487 B2 | 4/2007 | Pinter | |
| 7,260,438 B2 | 8/2007 | Caldwell et al. | |
| 7,413,321 B2 | 8/2008 | Kim et al. | |
| 7,434,951 B2 | 10/2008 | Bienick | |
| 7,628,525 B2 | 12/2009 | Lee et al. | |
| 7,628,585 B2 | 12/2009 | Lee et al. | |
| 7,670,018 B2 | 3/2010 | Kim et al. | |
| 8,021,009 B2 * | 9/2011 | Knoll | A47F 3/001 362/602 |
| 8,135,482 B2 | 3/2012 | Caldwell et al. | |
| 8,186,844 B2 | 5/2012 | Hall | |
| 8,322,873 B2 | 12/2012 | Glovatsky et al. | |
| 2004/0062031 A1 | 4/2004 | Pinter | |
| 2008/0121146 A1 | 5/2008 | Burns et al. | |
| 2008/0236183 A1 * | 10/2008 | Iimura | F25D 25/02 62/264 |
| 2009/0021927 A1 | 1/2009 | Hall et al. | |
| 2011/0079034 A1 | 4/2011 | Kim et al. | |
| 2011/0164399 A1 | 7/2011 | Driver et al. | |
| 2012/0043338 A1 * | 2/2012 | Yang | F25D 25/02 220/592.02 |
| 2012/0106129 A1 * | 5/2012 | Glovatsky | F25D 27/00 362/92 |

FOREIGN PATENT DOCUMENTS

| | | |
|---|---|---|
| EP | 1887299 B1 | 2/2008 |
| JP | 2007032861 A | 2/2007 |
| WO | 2007041708 A1 | 4/2007 |
| WO | 2009132954 A2 | 11/2009 |
| WO | 2013017792 A1 | 2/2013 |
| WO | 2014069872 A1 | 5/2014 |

* cited by examiner

METHODS AND APPARATUS TO PROVIDE LIGHTING IN REFRIGERATORS

CROSS-REFERENCE TO RELATED APPLICATIONS

This application is a continuation of U.S. patent application Ser. No. 14/207,982, (now U.S. Pat. No. 9,377,578), filed on Mar. 13, 2014, entitled "METHODS AND APPARATUS TO PROVIDE LIGHTING IN REFRIGERATORS," now U.S. Pat. No. 9,377,578, which claims the priority benefit of U.S. Provisional Patent Application No. 61/790,054 filed on Mar. 15, 2013, entitled "METHODS AND APPARATUS TO PROVIDE LIGHTING IN REFRIGERATORS," the disclosures of which are hereby incorporated herein by reference in their entireties.

FIELD OF THE DISCLOSURE

This disclosure relates generally to appliances such as, but not limited to, refrigerators, and more particularly to methods and apparatuses to provide lighting in appliances.

BACKGROUND

Many appliances include lighting to assist in the viewing of items present, placed or stored in an appliance.

SUMMARY

According to an aspect of the present disclosure, a refrigerator includes a compartment disposed within the refrigerator having first and second opposite side walls and a movable component having a front edge and being moveably mounted within the compartment with the front edge extending between the first and second side walls with a first end adjacent the first side wall. The refrigerator further includes a light pipe extending along the front edge of the movable component and having a first edge adjacent the first side wall and a first light source positioned on the first side wall and aligned with the first end to emit light into the first end of the light pipe.

According to another aspect, a movable component for use in an appliance includes a body defining a front edge extending laterally from a first side to a second side. A light pipe extends along a front edge of the body and includes a diffuser and first and second opposite ends respectively adjacent the first and second sides of the body. The component further includes a first light reflector extending along a portion of the light pipe adjacent the first end and further extending laterally beyond the first end.

These and other features, advantages, and objects of the present device will be further understood and appreciated by those skilled in the art upon studying the following specification, claims, and appended drawings.

DETAILED DESCRIPTION OF EMBODIMENTS

One of the problems with providing lighting or other features in appliances such as refrigerators relates to the use of electronics. When electronics are used within a cavity of an appliance, issues are presented regarding how to route power connections and/or other electrical connections to the electronics. Such problems are further complicated when movable/removable members such as, but not limited to, shelves, drawers, or bins have associated electronic components, assemblies, modules, etc. Although contacts or powered rails could be used to provide energy to the electronics on each member, such systems may be costly and/or complex to design and manufacture. To overcome at least these problems, methods and apparatus are disclosed herein that allow lighting to be efficiently provided within appliances.

Figure 1:
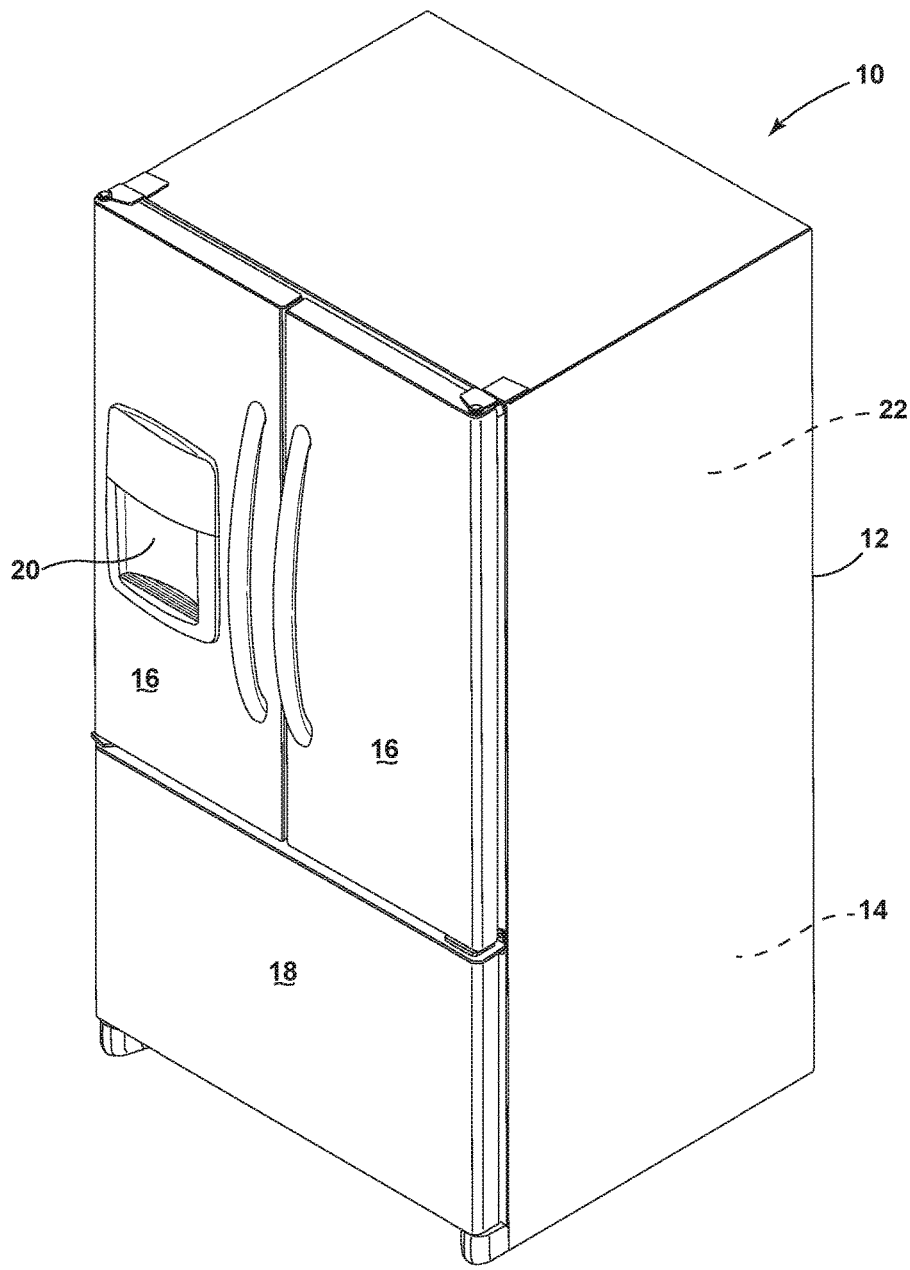
FIG. 1 illustrates an example prior-art refrigerator.

FIG. 1 illustrates an example prior-art refrigerator 10. The refrigerator 10 has a refrigerator cabinet or housing 12. The refrigerator 10 is a French door bottom mount refrigerator. The refrigerator 10 has a bottom mounted freezer and a freezer drawer 18 for providing access to a freezer compartment 14. The refrigerator 10 further includes a fresh food compartment 22 positioned above the freezer compartment 14 with French doors 16 to provide access to the fresh food compartment 22. A water and ice dispenser 20 is also shown. While not shown in FIG. 1 for simplicity, the water and ice dispenser 20 may include a user interface to enable a user to adjust, review and/or monitor one or more parameters of the refrigerator 10. For example, the user interface may be used to adjust and/or control whether light is emitted, or the intensity and/or color of light emitted by the example lighting disclosed herein. Alternatively, a user interface elsewhere in the refrigerator, for example, on shelf trim or a drawer front, may be used to adjust and/or control whether light is emitted, or the intensity and/or color of light emitted.

Although one particular style or configuration of refrigerator is shown in FIG. 1, it is to be understood that the methods, apparatus and systems disclosed herein may be used to provide lighting for any number of other styles or configurations of refrigerators including, but not limited to, side-by-side configurations, top-mounted freezer configurations, refrigerators with only a freezer compartment or only a fresh food compartment, refrigerators with reconfigurable space, refrigerators with additional compartments, or other configurations. In addition, the methods, apparatus and systems disclosed herein may be used to provide lighting for any other types of appliances including, but not limited to, standalone ice makers, dishwashers, washing machines, dryers, microwaves, ovens, shelving units, storage units, or any other apparatus, device, installation, or appliance for which lighting is desired.

Figure 2:
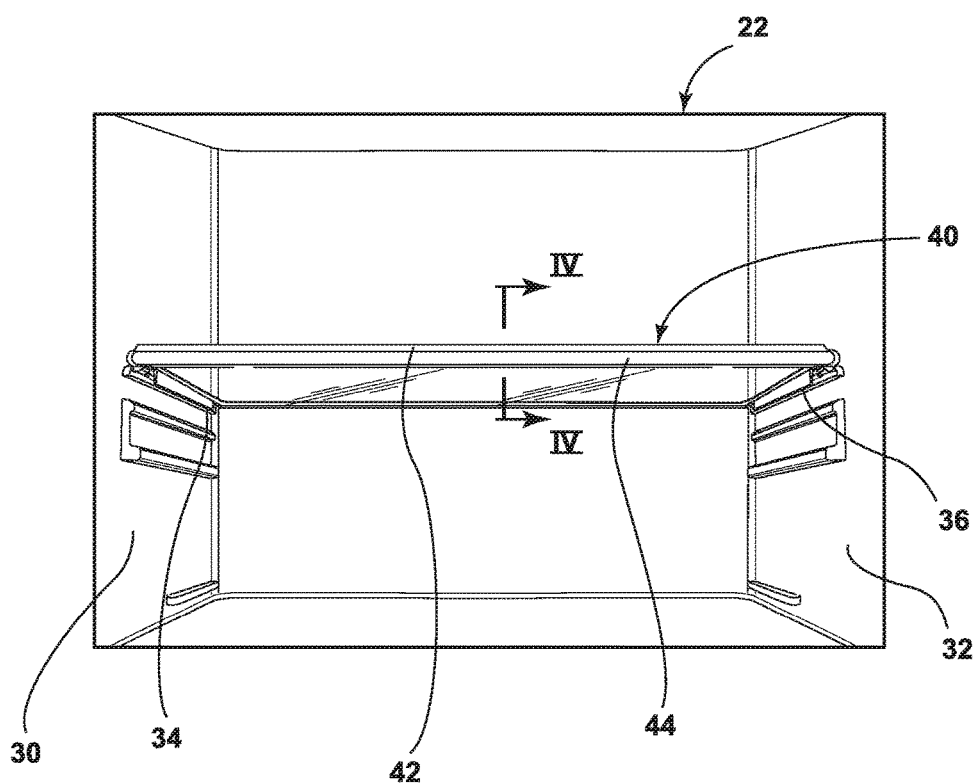
FIG. 2 illustrates an example refrigerator compartment including an example shelf having a light pipe constructed in accordance with the teachings of this disclosure.

FIG. 2 illustrates an interior of the fresh food compartment 22 of FIG. 1 including an example shelf 40 having lighting constructed in accordance with the teachings of this disclosure. The fresh food compartment 22 has first and second opposite side walls 30, 32. To support the example shelf, the fresh food compartment 22 includes first and second opposite shelf supports 34, 36 attached to respective ones of the side walls 30, 32. In some examples, two shelves 40 may be used to span the compartment 22. In such examples, there may be one or more brackets or other supports in the middle of compartment to support inner sides of the shelves 40. The example shelf 40 of FIG. 2 may be removed and/or repositioned elsewhere within the interior of the fresh food compartment 22 such as on a different set of shelf supports.

Figure 3:
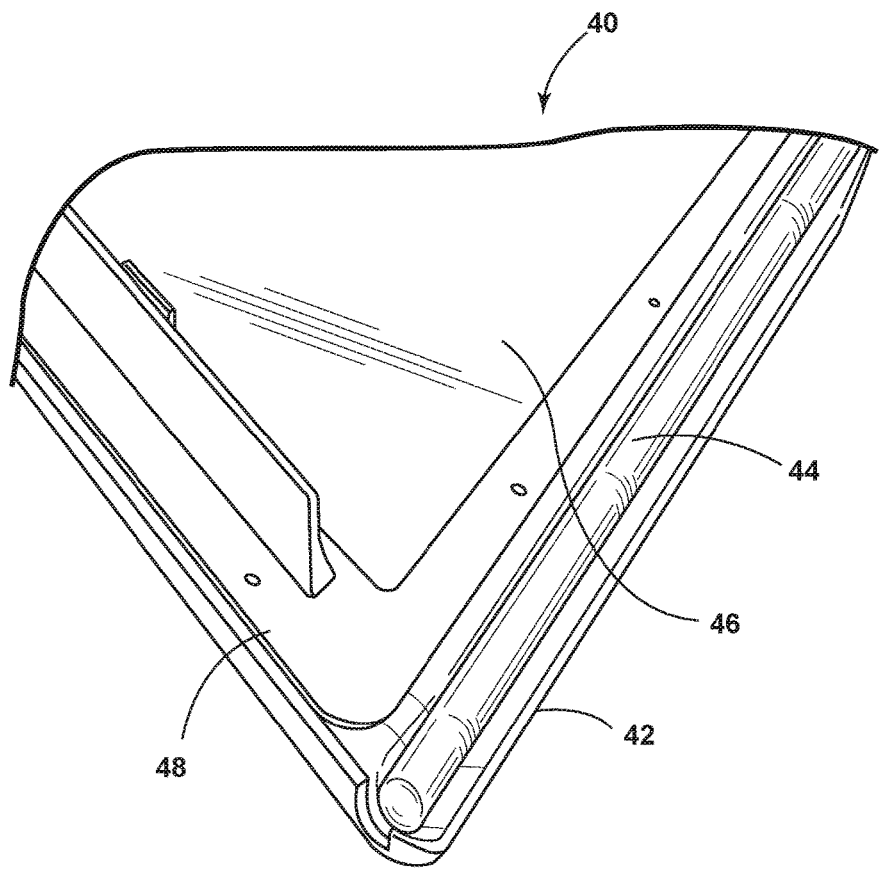
FIG. 3 is a bottom view of a portion of the example shelf of FIG. 2.
Figure 4:
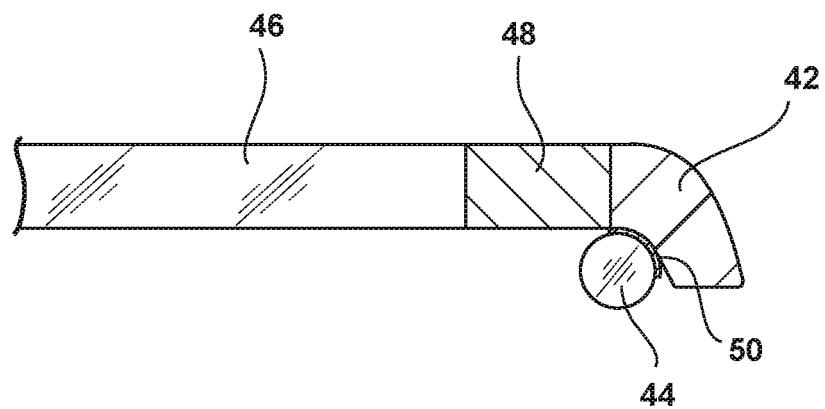
FIG. 4 is a cross section view of the example shelf of FIG. 2 taken along line 4-4 of line 2.
Figure 5:
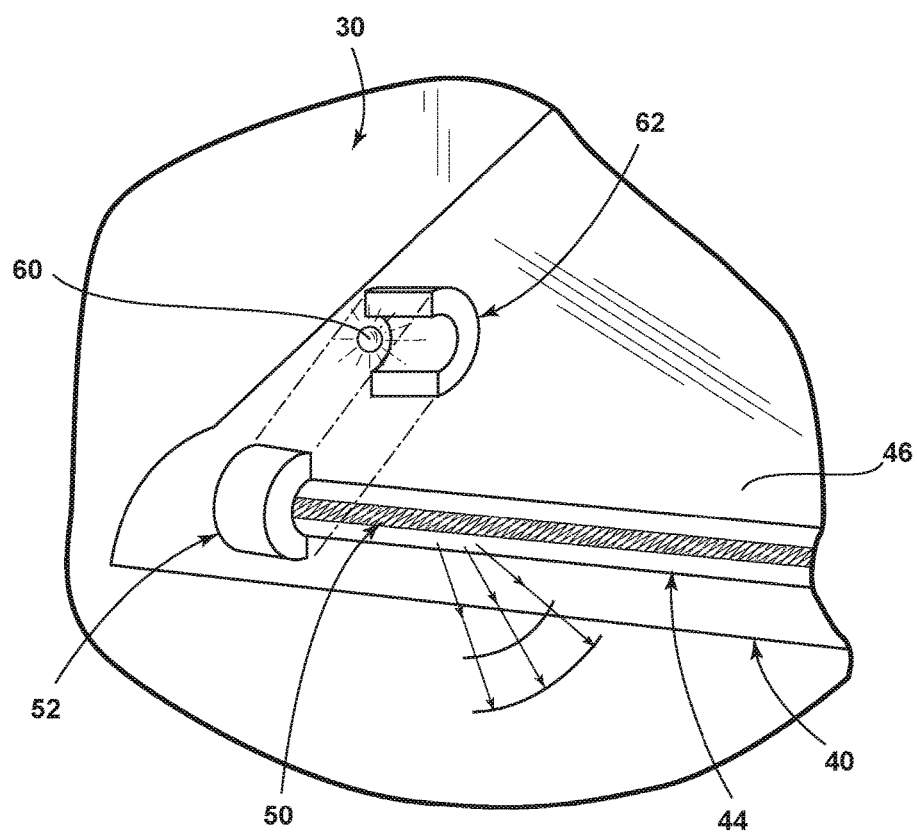
FIG. 5 illustrates an example coupling of the example shelf of FIGS. 2-4 to a side wall of the example compartment of FIG. 2.

As shown in FIGS. 2-4, the example shelf 40 has front trim or a front surface 42 with a light pipe 44 extending along the front trim 42 of the shelf 40. The example light pipe 44 of FIGS. 2-4 extends underneath the front trim 42 of the shelf 40, or a shelf handle. Alternatively, the light pipe 44 may extend above or in front of the front trim 42 and/or handle. The light pipe 44 may be attached to the front trim 42 and/or be partially or wholly embedded within the front trim 42. In some examples, the light pipe 44 has a diffuser that may be, for example, printed thereon, physically scored into, adhered to, or coated onto. The diffuser can be either over the entire light pipe to effect a substantially even lighting effect, or in small sections using various shapes/sizes to, for example, emitted light in particular directions. As shown in FIGS. 4 and 5, the light pipe 44 may additionally or alternatively have a reflector 50 longitudinally extending along the light pipe 44 that reflects light into the compartment 22. The light pipe 44 can be attached to, for example, a movable bin, a movable drawer, a handle, a movable shelf, in stationary locations that the customer is not intended to move, etc. As best shown in FIG. 5, when the example shelf 40 is fully positioned within the compartment 22, one or both ends of the light pipe 44 are positioned opposite, or aligned with respective light sources 60 (FIG. 5) placed on, positioned at, embedded within, etc. the side walls 30 and 32. Light emitted by the light source(s) 60 passes into the light pipe 44 and is subsequently emitted into the compartment 22. Alternatively, the light sources 60 may be positioned such that light is emitted from a light pipe of a movable component, such as a bin or drawer, when the movable component is at least partially opened. For example, an interior of a drawer, a dispensing bin of a washing machine, etc. may be illuminated when in an at least partially open position.

FIG. 3 is a bottom view of the example shelf 40 of FIG. 2. As shown in FIG. 3, the example shelf 40 has a main body 46 which may be formed of glass, clear plastic, or any other transparent, semi-transparent, or opaque material. In the example of FIG. 3, there is a trim 48 that surrounds edges of the main body 46. It is to be understood that the trim 48 need not surround all edges of the main body 46. The light pipe 44 is shown extending underneath the front trim 42. In some examples, the shelf 40 does not either the trim 48 or the front trim 42 at a front edge of the shelf 40. In such examples, the light pipe 44 may be embedded into and/or formed as part of the main body 46. Alternatively, the trim 48 and the front trim 42 may be combined into a single component. Thus, in general, the light pipe 44 extends across a front edge of the shelf 40 regardless of whether the front edge is formed by the front trim 42, a combined front trim 42 and trim component 48, or the main body 46.

FIG. 4 provides another view of the example shelf 40 of FIGS. 2-4 with the example light pipe 44. The light pipe 44 has a reflector 50 and, additionally or alternatively, a printed diffuser or physical scoring (not shown for simplicity). Light is ejected or emitted from the light pipe 44 opposite the reflector 50, if it is present. If a diffuser is included it will improve the uniformity of light emitted from the light pipe 44. In some examples, the light pipe 44 includes neither a reflector nor a diffuser. The shelf 40 may include a connector 52 which is attached to the light pipe 44 and/or to the shelf 40 and provides for reflecting, guiding, directing or transmitting light from a light module or light source 60 into the light pipe 44.

The light module or light source 60 may be, for example, a light emitting diode (LED) or an LED array. In some examples, the light source 60 may be selectively controlled to emit different intensities and/or colors of light. In the example of FIG. 5, the light source 60 is an LED module embedded in the side wall 30 of the compartment 22 and is positioned to be aligned with the light pipe 44 when the shelf 40 is fully positioned within the compartment 22. One or both ends of the light pipe 44 may include a lens, a concave surface, a convex surface, a flat surface, and/or a shiny surface to improve the coupling of light from the light source 60 into the light pipe 44.

A refrigerator supporting the example shelf 40 disclosed herein may include a controller or control system to control operation of the light source 60 in response to one or more events. Example events include, but are not limited to, a user action, opening of the refrigerator, proximity of the user to the shelf, contact of the user with the shelf, etc. The light source 60 may be on when the door is open regardless of whether the shelf 40 is installed, or may be configured to only illuminate when the light pipe 44 is in place. The controller and/or control system may adjust the intensity and/or color of light emitted from the light pipe 44 in response to one or more inputs received, for example, via the user interface of the ice and water dispenser 20.

A light reflector 62 is shown which may be opaque and formed of plastic to block light from the light source 60 from illuminating the back portion of the shelf 40. Thus, light from the light source 60 may be more fully directed towards the light pipe 44 to illuminate the light pipe 44. In some examples, to the reflector 62 focuses the light into the pipe 44 when the shelf 40 is in place. The example reflector 62 also hides the light source 60 from being directly visible. These features allow for aesthetic purposes to prevent bright spots at the edge of the light pipe 44, which may distract from the aesthetic benefits of the light pipe 44 with diffuser 50. The connector 52 may also be a light reflector operating similarly to the light reflector 62. In some examples, the connector 52 and the light reflector 62 form a light reflector and light director.

Thus, instead of trying to safely get energy to movable members in the cavity of an appliance to power electronics in the movable members, the use of light pipes under a movable member keeps the electronics stationary and directs the light where it is desired. Therefore, targeted lighting may be provided in a manner that eliminates the need to specifically route electronics within the cavity of an appliance. The light modules may be embedded into the side walls of the refrigerator as they are and the light may be routed using light pipes, which may have a reflector and/or a diffuser to selectively direct light where it is desired.

Although described primarily in terms of a refrigerator with a shelf or shelf handle, it is to be understood that the same or similar structures with the same or similar functionality may be used otherwise. For example, instead of a shelf, the lighting may be provided in a bin or drawer of a refrigerator, or other stationary or removable component of an appliance.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A refrigerator comprising:
    a compartment disposed within the refrigerator having first and second opposite side walls;
    a movable component having a front edge and being moveably mounted within the compartment between a first position with the front edge extending between the first and second side walls with a first end adjacent the first side wall and a second position with the front edge translated in a direction parallel with the first side wall from the first position;
    a light pipe externally fixed to and extending along the front edge of the movable component and having a first end adjacent the first side wall when the moveable component is in the first position; and
    a first light source fixedly positioned on the first side wall and aligned with the first end to emit light into the first end of the light pipe when the moveable component is in the first position and displaced relative to the first end when the moveable component is in the second position such that the first light source is not aligned with the first end.

2. The refrigerator of claim 1, wherein the compartment defines an opening, the first and second opposite side walls extending inward from the opening, the refrigerator further comprising:
    a first light reflector having at least a portion thereof extending from the first side wall beyond the first light source and positioned between the first light source and opening.

3. The refrigerator of claim 2, wherein at least the portion of the first light reflector further extends from the first side wall beyond the first end of the light pipe.

4. The refrigerator of claim 2, wherein:
    the portion of first light reflector is a first portion and defines a semicircular shape;
    a second portion of the first light reflector is mounted to the movable component and defines a semicircular shape; and
    the first and second portions align to define a generally circular connector surrounding the light source and at least the first end of the light pipe.

5. The refrigerator of claim 1, wherein:
    the moveable component includes an opaque trim piece defining the front edge thereof; and
    the light pipe is mounted to an underside of the trim piece.

6. The refrigerator of claim 5, wherein the trim piece defines a channel receiving the light pipe therein and surrounding a portion thereof disposed toward a top of the moveable component and along the front edge, a remaining portion thereof being exposed outside the channel.

7. The refrigerator of claim 6, wherein the channel is complementary in shape to and contacts the light pipe along the portion of the light pipe surrounded by the channel.

8. The refrigerator of claim 6, wherein a reflector extends along and in contact with the light pipe within the channel.

9. The refrigerator of claim 6, further comprising a transparent substrate, wherein:
    the trim piece extends around an outer edge of the transparent substrate.

10. The refrigerator of claim 9, wherein the trim piece is a rectangular frame fully surrounding the transparent substrate.

11. The refrigerator of claim 1, wherein the movable component is one of a shelf, a basket, or a bin.

12. The refrigerator of claim 1, wherein the first end of the light pipe comprises at least one of a lens, a concave surface, a convex surface, a shiny surface or a flat surface.

13. The refrigerator of claim 1, further comprising a second light module positioned at the second side wall to emit light into a second end of the light pipe adjacent thereto.

14. The refrigerator of claim 1, further comprising a control system operatively connected to the first light source and programmed to disable the light source if the moveable component is moved to a position wherein the light pipe is unaligned with the light source.

15. The refrigerator of claim 1, wherein the first light source is embedded in the first side wall, the first end of the light pipe contacting the first side wall.

16. The refrigerator of claim 1, wherein:
    the first side wall defines a support extending therefrom, the moveable component being positioned on the support; and
    the lighting element is positioned forward of the support.

17. A movable component for use in an appliance, comprising:
    a body defining a front edge extending laterally from a first side to a second side;
    an opaque trim piece defining the front edge thereof and having an underside surface with a concave, arcuate profile;
    a light pipe being cylindrical in profile, mounted directly to the underside surface of the trim piece within the concave, arcuate profile, and extending linearly along and external to a front edge of the body, the light pipe comprising:
        a diffuser; and
        first and second opposite ends respectively adjacent the first and second sides of the body, at least one of the first and second ends defining a light receiving surface positionable in an aligned manner with a light source of the appliance to receive light from the light source and in a displaced manner with respect to the light source with movement of the moveable component; and
    a first light reflector at least partially circumferentially surrounding at least a forward portion of the light pipe and extending along a portion of the light pipe adjacent the first end and further extending laterally beyond the first end.

18. The component of claim 17, wherein:
    the trim piece is a drawer face; and
    the underside of the trim piece is at least partially defined on a handle of the drawer face.

19. The component of claim 17, wherein the body defines one of a shelf, a bin, or a basket.

* * * * *